B. WILLIAMS & M. COHN.
Corn-Planters.
No. 150,645.
Patented May 5, 1874.
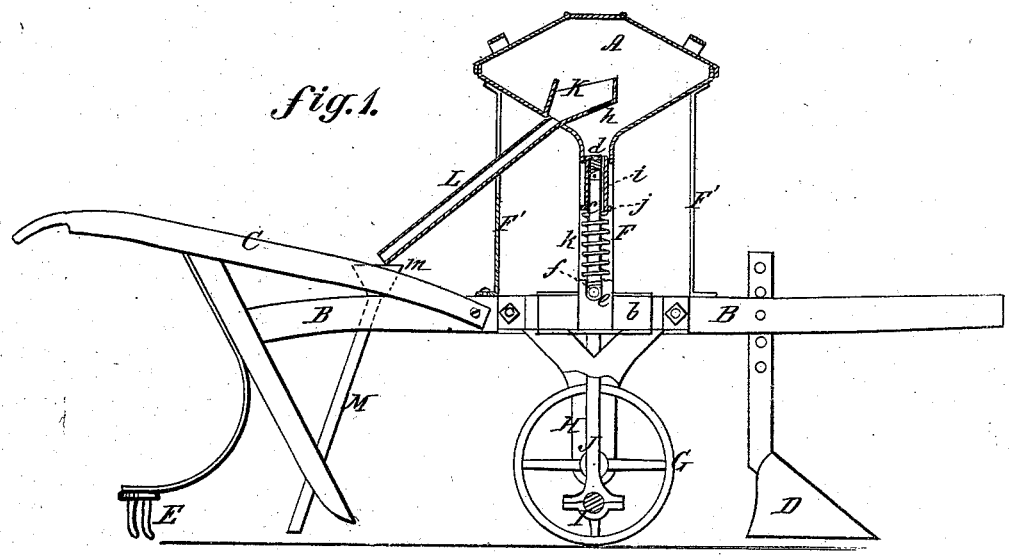
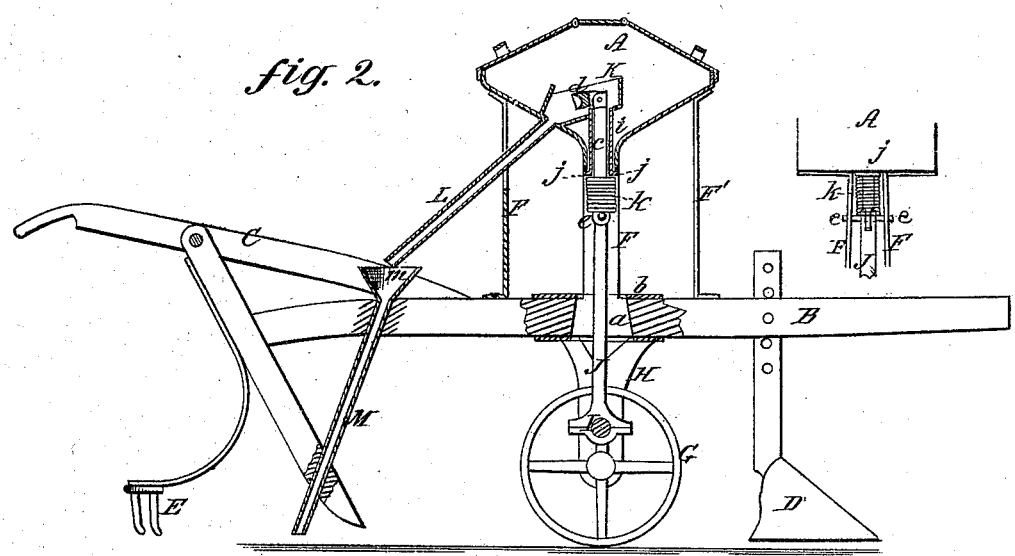
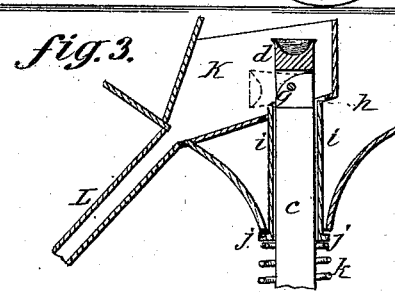

UNITED STATES PATENT OFFICE.

BLASIUS WILLIAMS AND MORRIS COHN, OF JEFFERSON, TEXAS; SAID COHN ASSIGNOR OF HIS RIGHT TO WALDE SALOMONSKY, OF SAME PLACE.

IMPROVEMENT IN CORN-PLANTERS.

Specification forming part of Letters Patent No. 150,645, dated May 5, 1874; application filed March 3, 1874.

*To all whom it may concern:*

Be it known that we, BLASIUS WILLIAMS and MORRIS COHN, of Jefferson, in the county of Marion and State of Texas, have invented certain new and useful Improvements in Corn-Planters, of which the following is a specification:

Our invention relates to corn-planters in which the corn is planted in hills or rows; and the particular features of our invention consist in the combination, with a pivoted rising and descending charger or cup, of a sleeve-seat for said charger, a charger-carrying stem, and the seed-hopper, whereby the charger is held and carried in position upon a seat to fill, to rise from said seat, and to dump upon its pivot, and to be again brought into and maintained in a vertical position upon said seat while descending through the corn, whereby the charger is held and moved vertically through the grain from the bottom of the hopper to receive and discharge the filled charge above the corn in the hopper; also, in the combination of the pivoted charger or cup, its carrying-stem, and the sleeve-seat for said charger, with a spring supported upon the charger-stem, to form a seat for the sleeve and to carry the latter up with the charger, so that they both enter the receiving-tray at once, the ascent of the sleeve being limited by a stop, while the charger moves on by its rod to dump, and again to bring back the charger upon its seat before the spring releases the sleeve; also, in the combination of the pivoted charger, its carrying-stem, sleeve-seat, and spring, with slotted guide-standards and a jointed rod, connecting with supporting crank-wheels, whereby both the charger and its sleeve-seat are operated by the same crank-pin.

In the accompanying drawings, Figure 1 represents a partial section of a corn-planter embracing our invention, the charger or cup being in its lowest position in the hopper; Fig. 2, a vertical section, showing the charger or cup in the position it has in discharging the corn; and Fig. 3, an enlarged section, showing the charger within the receiving-tray, and the sleeve-seat held up by the spring.

The hopper A is mounted upon a beam, B, which is provided with handles C, a plow-point, D, to make the furrow for the corn, and a coverer, E, which harrows the soil over the corn in the furrow. Beneath the hopper the beam has an oblong mortise, *a*, Fig. 2, which is guarded by a metal band, *b*, from each side of which rise two slotted standards, F, which support the hopper in connection with two braces, F', rising from the beam. The planting device is operated by two wheels, G, supported in drop brackets H on each side of the beam in vertical line with the hopper, while a crank-pin, I, on the wheels connects with and operates a rod, J, whose upper end is jointed with a stem, *c*, which passes through the bottom of the hopper and carries the charging-cup *d* in its vertical movement produced by the revolutions of the crank-pin I. The pivot *e* of the jointed rods J and *c* passes through the slots *f* in the standards F, to keep the charger-carrying rod *c* in position, and allow the connecting-rod J to vibrate with the crank-pin. The upper end of the rod *c* carries the charger or cup *d*, which is pivoted so as to allow it to fall or turn over automatically to one side only, by rounding one side of the end of said rod as shown at *g*, in Fig. 3, over which rounded end the flat bottom of the cup can turn down one way, and when the cup is turned up the bottom will rest upon the end of the rod. A receiving-tray, K, is placed within the hopper A to receive the corn from the tilting-cup, and for this purpose an opening, *h*, is made in the bottom of the tray, through which the charger is projected before it turns upon its pivot to dump the corn. This tray has a chute, L, which discharges the corn into a tube, M, which deposits it in the furrow, the junction of the chute and tube being a funnel-mouth, *m*, so that the attendant can see at all times whether the corn is being planted regularly. A sleeve-seat, *i*, for the charger *d* incloses the upper portion of the rod *c*, and moves with it through an opening in the bottom of the hopper. Its upper end incloses and forms the seat for the charger, and in this position the charger *d* and sleeve *i* rise and fall through the body of the corn in the hopper. The ascent of the seat *i* is limited by a stop or collar, *j*, striking against the bottom of the hopper, in Fig. 3, and it is raised by a spring, *k*, upon which it rests, and which is itself supported upon the pivot-pin *e* of jointed rods J and *c*, while the descent of the sleeve *i* is caused by that of the charger *d* seated upon it, and whose rising and falling movement is produced by the crank-wheels. The sleeve-seat *i* and the charger-carrying stem *c* rise together until the sleeve enters the tray K, when it is arrested by the stop *j*, and the charger continues up until its pivot is above the end of the sleeve and within the tray, when it dumps to one side and empties the corn therein, and immediately thereafter is drawn down into the sleeve and resumes its seat therein, the descent of the stem *c* straightening the pivoted charger by drawing it down against the end of the sleeve *i* before the latter starts to descend. By this construction, the cup *d* rises through the body of the grain, and fills, empties, and descends through the corn freely, bringing up its cup full above the body of the corn and turning it out into the chute L at every revolution of the crank-pin of the operating-wheels. The distance of the hills apart may be changed and regulated by using larger or smaller wheels. To drill in corn—that is, plant it close together—several chargers may be used to operate in succession. Several rows can be planted at once. The number of kernels can be changed by screwing a larger or smaller charger to the carrying-stem.

We claim—

1. The combination of a pivoted rising and descending charger or cup, *d*, with an inclosing-sleeve tube-seat, *i*, for the charger *d*, a charger-carrying stem, *c*, and the hopper, substantially as and for the purpose described.

2. The combination, with the inclosing-charger tube-seat *i* and the jointed stem *c* J, which carries the charger *d*, of a spring, *k*, carried by the jointed stem *c*, to support and operate the said tube *i* simultaneously with the charger, substantially as described.

3. The combination of the charger *d* and tube-seat *i*, carrying jointed rods *c* and J, with the slotted guide-standards F, the spring *k*, and the crank-wheels G, substantially as and for the purpose described.

In testimony whereof we have hereunto signed our names this 19th day of August, A. D. 1873.

BLASIUS WILLIAMS.
MORRIS COHN.

Witnesses:
CHS. GOLDBERG,
LEWIS H. SCHUBERT.